United States Patent [19]
Cuevas

[11] Patent Number: 5,762,364
[45] Date of Patent: Jun. 9, 1998

[54] VEHICLE STEERING WHEEL INCLUDING INFLATION FLUID TANK STRUCTURE

[75] Inventor: Jess A. Cuevas, Scottsdale, Ariz.

[73] Assignee: TRW Inc., Lyndhurst, Ohio

[21] Appl. No.: 690,858

[22] Filed: Aug. 1, 1996

[51] Int. Cl.⁶ .................................................. B60R 21/16
[52] U.S. Cl. ........................... 280/731; 280/737; 280/741
[58] Field of Search ................................ 280/731, 736, 280/737, 741

[56] References Cited

U.S. PATENT DOCUMENTS

| | | | |
|---|---|---|---|
| 3,506,281 | 4/1970 | Berryman | 280/731 |
| 3,525,536 | 8/1970 | Pruneski | 280/731 |
| 3,774,932 | 11/1973 | Schiesterl | 280/731 |
| 3,960,390 | 6/1976 | Goetz | 280/731 |
| 4,828,286 | 5/1989 | Fohl | 280/731 |
| 5,066,038 | 11/1991 | Frantom et al. | 280/731 |
| 5,277,422 | 1/1994 | Cuevas | 280/731 |
| 5,333,897 | 8/1994 | Landis et al. | 280/731 |
| 5,351,977 | 10/1994 | Grace | 280/731 |
| 5,380,037 | 1/1995 | Worrell et al. | 280/731 |
| 5,382,046 | 1/1995 | Cuevas | 280/731 |
| 5,553,888 | 9/1996 | Turner et al. | 280/731 |

*Primary Examiner*—Kenneth R. Rice
*Attorney, Agent, or Firm*—Tarolli, Sundheim, Covell, Tummino & Szabo

[57] ABSTRACT

A vehicle occupant protection apparatus (10) includes a vehicle steering wheel (14) with a rim (16), a spoke (18), and a hub (20). The hub (20) includes a tank structure (28) defining a storage chamber (29) containing inflation fluid under pressure. The tank structure (28) transmits steering torque from the rim (16) and the spoke (18) to a vehicle steering shaft (22).

11 Claims, 4 Drawing Sheets

VEHICLE STEERING WHEEL INCLUDING INFLATION FLUID TANK STRUCTURE

FIELD OF THE INVENTION

The present invention relates to an apparatus including an inflatable vehicle occupant protection device, and particularly relates to an apparatus which is mounted on a vehicle steering column.

BACKGROUND OF THE INVENTION

An inflatable vehicle occupant protection device, such as an air bag, is part of an apparatus which further includes an inflator. The inflator comprises a source of inflation fluid for inflating the air bag. Accordingly, the inflator may have a housing with inflation fluid outlet openings. Such a housing contains an ignitable gas generating material which, when ignited, generates a large volume of inflation gas. The inflator may alternatively include a tank which is closed and sealed. Such a tank contains a stored quantity of pressurized inflation fluid, or a combination of pressurized inflation fluid and ignitable material for heating the inflation fluid. In each case, the inflator has an electrical initiator connected in an electrical circuit with a collision sensor.

The collision sensor senses vehicle conditions that indicate the occurrence of a collision. When the collision sensor senses a collision-indicating condition of at least a predetermined threshold level, electric current is directed through the initiator in the inflator. Depending upon the type of inflator, the initiator opens the tank and/or ignites the ignitable material in the tank or the housing. The initiator thus initiates a flow of inflation fluid from the inflator to the air bag.

The air bag and the inflator may be installed in the vehicle at any one of several different locations adjacent to the vehicle occupant compartment. For example, an air bag and an inflator at the passenger side of a vehicle may be installed in the vehicle instrument panel. An air bag and an inflator at the driver's side of the vehicle may be installed on the steering column near the center of the steering wheel. A tank at that location is typically mounted on the hub of the steering wheel.

SUMMARY OF THE INVENTION

In accordance with the present invention, a vehicle occupant protection apparatus comprises a vehicle steering wheel structure including a spoke and a hub. The hub comprises a tank structure defining a storage chamber containing inflation fluid under pressure. The tank structure includes means for transmitting steering torque from the spoke to a vehicle steering shaft.

As compared with a conventional driver's side protection apparatus, a driver's side protection apparatus constructed in accordance with the present invention has fewer parts. This is because the inflation fluid tank has the structure and function of a steering wheel hub which transmits steering torque to a vehicle steering shaft. The invention thus eliminates the need for a conventional tank which is separate from the steering wheel hub, as well as the additional parts that are used to mount such a tank on a hub.

In a preferred embodiment of the present invention, the apparatus comprises first and second units of interconnected parts. The parts of the first unit include the vehicle steering wheel structure, and further include an electrical initiator. The parts of the second unit include an inflatable vehicle occupant protection device, a cover structure with a deployment door, and a retainer. The retainer comprises means for connecting the protection device to the cover structure at a location remote from the first unit. The retainer further comprises means for snapping into interlocked engagement with the steering wheel structure to connect the second unit to the first unit.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
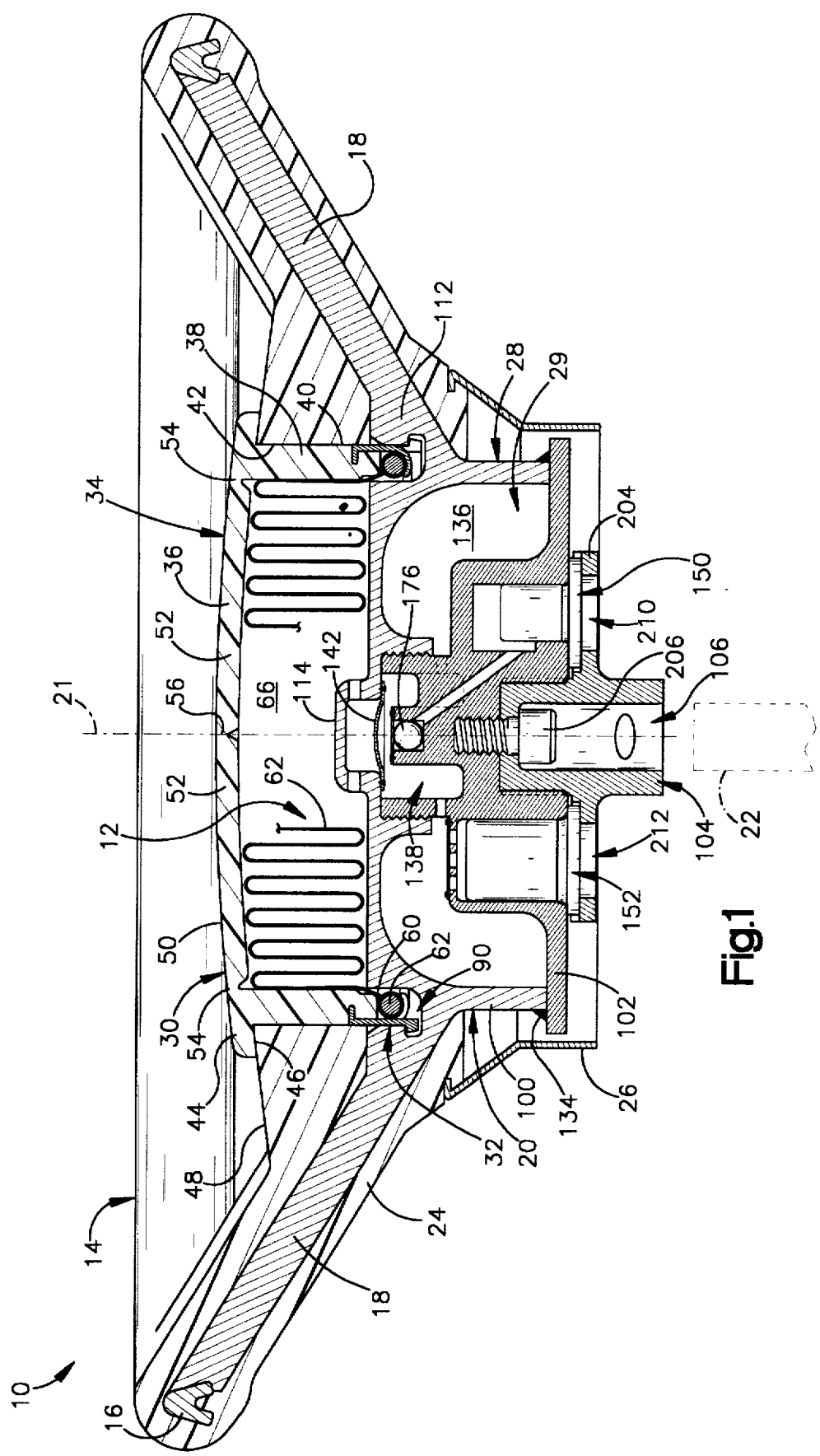
FIG. 1 is a sectional view of a vehicle occupant protection apparatus comprising a first embodiment of the present invention.

A vehicle occupant protection apparatus 10 comprising a first embodiment of the present invention is shown in FIG. 1. The apparatus 10 includes a particular type of inflatable vehicle occupant protection device 12 (shown schematically) which is commonly referred to as an air bag. The air bag 12 is mounted on a vehicle steering wheel 14, and is inflatable upward, as viewed in FIG. 1, from the steering wheel 14 to help protect a vehicle driver.

The steering wheel 14 includes a rim 16, a plurality of spokes 18, and a hub 20 with an axis of rotation 21. The hub 20 transmits steering torque from the rim 16 and the spokes 18 to a steering shaft 22 (shown schematically) on a vehicle steering column. A cover portion 24 of the steering wheel 14 encapsulates the rim 16 and the spokes 18. A generally cylindrical skirt 26 projects downward from the cover portion 24 to conceal the hub 20 from view in a vehicle occupant compartment. In accordance with the present invention, the hub 20 comprises a tank structure 28 which defines a storage chamber 29. The storage chamber 29 contains pressurized inflation fluid for inflating the air bag 12.

Figure 2:
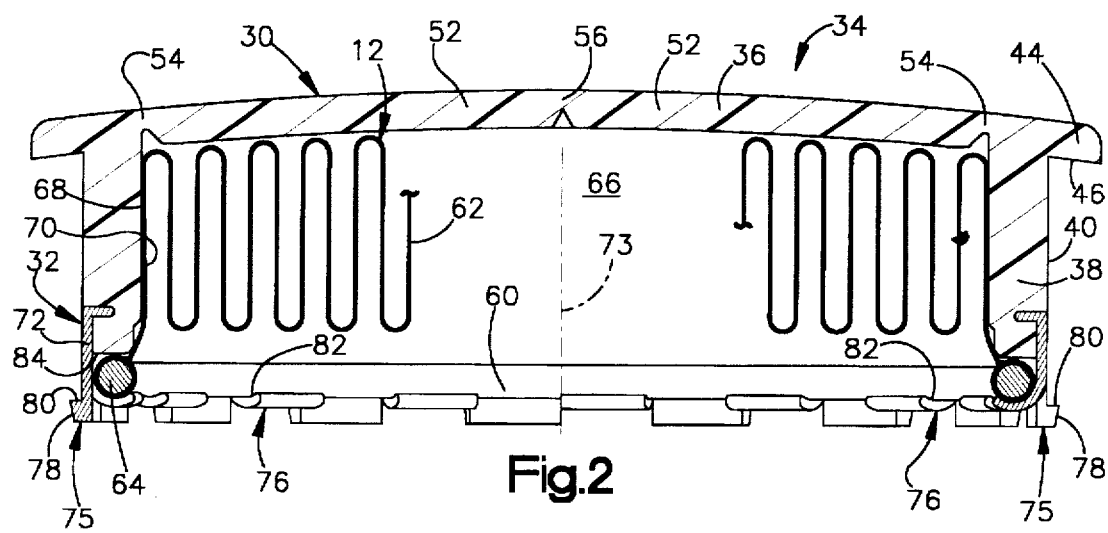
FIG. 2 is a sectional view of parts shown in FIG. 1.

The apparatus 10 further includes a central cover structure 30 and a retainer 32. As shown in FIG. 2, the central cover structure 30, the retainer 32, and the air bag 12 are interconnected separately from the steering wheel 14. The central cover structure 30, the retainer 32, and the air bag 12 thus define a preassembled air bag unit 34 which can be installed on the steering wheel 14 in the position shown in FIG. 1.

The central cover structure 30 fits closely with the cover portion 24 of the steering wheel 14 when the air bag unit 34 is installed on the steering wheel 14. Specifically, the central cover structure 30 includes a deployment panel 36 and a depending base wall 38. The base wall 38 has a cylindrical shape centered on the axis 21. A cylindrical outer surface 40 of the base wall 38 fits closely against a surrounding cylindrical inner surface 42 of the cover portion 24. The deployment panel 36 extends across the axis 21, and has a narrow peripheral section 44 projecting a short distance radially outward from the base wall 38. An inner surface 46 of the peripheral section 44 overlies an outer surface 48 of the cover portion 24. An outer surface 50 of the deployment panel 36 continues the trim theme of the steering wheel 14 across the center of the steering wheel 14.

The deployment panel 36 defines a pair of deployment doors 52 and a corresponding pair of bendable hinges 54. A relatively thin section 56 of the deployment panel 36 comprises a rupturable stress riser with an H-shaped configuration extending along three sides of each deployment door 52. The central cover structure 30, as well as the cover portion 24 of the steering wheel 14, can be formed of any suitable material known in the art. Additionally, the structure, number, and locations of the deployment doors 52, the hinges 54, and the stress riser 56 can vary from those shown in the drawings, as known in the art.

The structure of the air bag 12 is defined by panels that can be formed of any suitable air bag material, including woven materials and plastic films. The panels of air bag material are interconnected along seams which can be formed by stitches, ultrasonic welds, adhesives, heat-staking, or the like, depending upon the material of which the panels are formed. Preferably, the air bag 12 is constructed of panels that are formed of a nylon fabric coated with silicone. Such an air bag material is known in the art.

As shown schematically in the drawings, the air bag 12 has a mouth 60 and a folded body 62. The mouth 60 of the air bag 12 is wrapped around a ring-shaped bead 64, and is secured around the bead 64 by one or more seams (not shown) in a known manner. The body 62 of the air bag 12 is folded into a short, generally cylindrical configuration, and is contained in a compartment 66 in the central cover structure 30. A peripheral surface 68 of the folded body 62 adjoins a surrounding side inner surface 70 of the base wall 38. The adjoining surfaces 68 and 70 fit together tightly enough for the base wall 38 to retain the folded body 62 within the compartment 66 during handling of the preassembled air bag unit 34 (FIG. 2). The retainer 32 holds the bead 64, and hence the mouth 60 of the air bag 12, against the base wall 38 during handling of the air bag unit 34.

Figure 3:
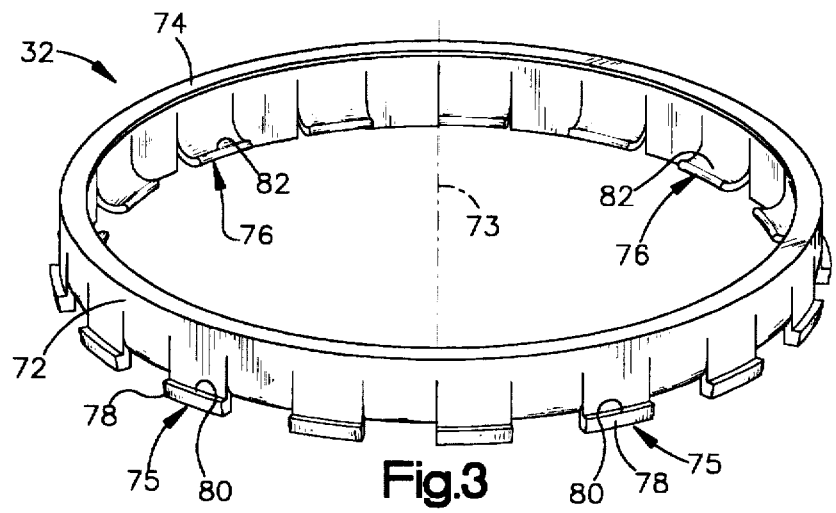
FIG. 3 is a perspective view of a part shown in FIGS. 1 and 2.

As shown separately in FIG. 3, the retainer 32 is a ring with an annular wall 72 centered on an axis 73. A circular flange 74 projects radially inward at the top of the annular wall 72. A plurality of tabs are located at the bottom of the annular wall 72. These include locking tabs 75 and bead tabs 76 in circumferentially alternating positions. Each locking tab 75 has a wedge-shaped lower end portion 78 projecting radially outward, and has a planar shoulder surface 80 facing axially upward. Each bead tab 76 has an arcuate shape projecting radially inward, and has a concave shoulder surface 82 facing axially upward.

As shown in FIG. 2, the flange 74 on the retainer 32 is embedded in the base wall 38 of the central cover structure 30. The bead tabs 76 on the retainer 32 are located directly beneath an annular lower end surface 84 of the base wall 38. When the body 62 of the air bag 12 has been placed in the compartment 66, the bead 64 and the surrounding portion of the mouth 60 are inserted between the bead tabs 76 and the lower end surface 84. The bead 64 and the mouth 60 are thus held radially within the annular wall 72 of the retainer 32, and are held axially between the bead tabs 76 and the base wall 38.

Figure 4:
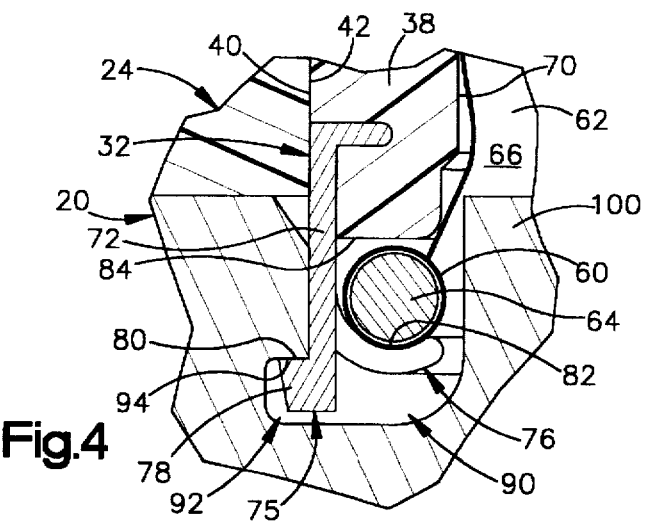
FIG. 4 is an enlarged partial view of parts shown in FIG. 1.

When the air bag unit 34 is being installed on the steering wheel 14, it is moved downward along the axis 21 so as to move the central cover structure 30 into a close fit with the cover portion 24 of the steering wheel 14, as described above. As the air bag unit 34 approaches the installed position of FIG. 1, the locking tabs 75 on the retainer 32 move into a ring-shaped groove 90 at the top of the hub 20. The lower end portions 78 of the locking tabs 75 snap into interlocked engagement with the hub 20 in a radially recessed portion 92 (FIG. 4) of the groove 90. More specifically, the shoulder surfaces 80 on the locking tabs 75 move into abutment with an opposed, annular inner surface 94 of the hub 20 in the recessed portion 92 of the groove 90. The bead tabs 76, the bead 64, and the mouth 60 of the air bag 12 also are contained within the groove 90.

As noted above, the hub 20 comprises the tank structure 28 which defines the inflation fluid storage chamber 29. The storage chamber 29 is defined by and between an upper hub part 100 and a lower hub part 102. The upper and lower hub parts 100 and 102 have generally circular peripheral shapes centered on the axis 21, and are supported by a generally cylindrical sleeve 104 which also is centered on the axis 21. The sleeve 104 has a bore 106 which receives the steering shaft 22 in a known manner upon mounting of the steering wheel 14 on the vehicle steering column. When the steering wheel 14 has been mounted on the steering column, the upper hub part 100, the lower hub part 102, and the sleeve 104 together transmit steering torque from the rim 16 and the spokes 18 to the steering shaft 22.

The upper hub part 100 defines the groove 90 at the top of the hub 20. In the first embodiment of the present invention, the spokes 18 and the upper hub part 100 are constructed together as contiguous portions of a continuous body 112 of metal material. A central portion 114 of the upper hub part 100 projects a short distance upward into the compartment 66 in the central cover structure 30. The central portion 114 of the upper hub part 100 is shaped as an inflation fluid outlet manifold with an outlet plenum 116 (FIG. 5) and a plurality of outlet openings 118.

Figure 5:
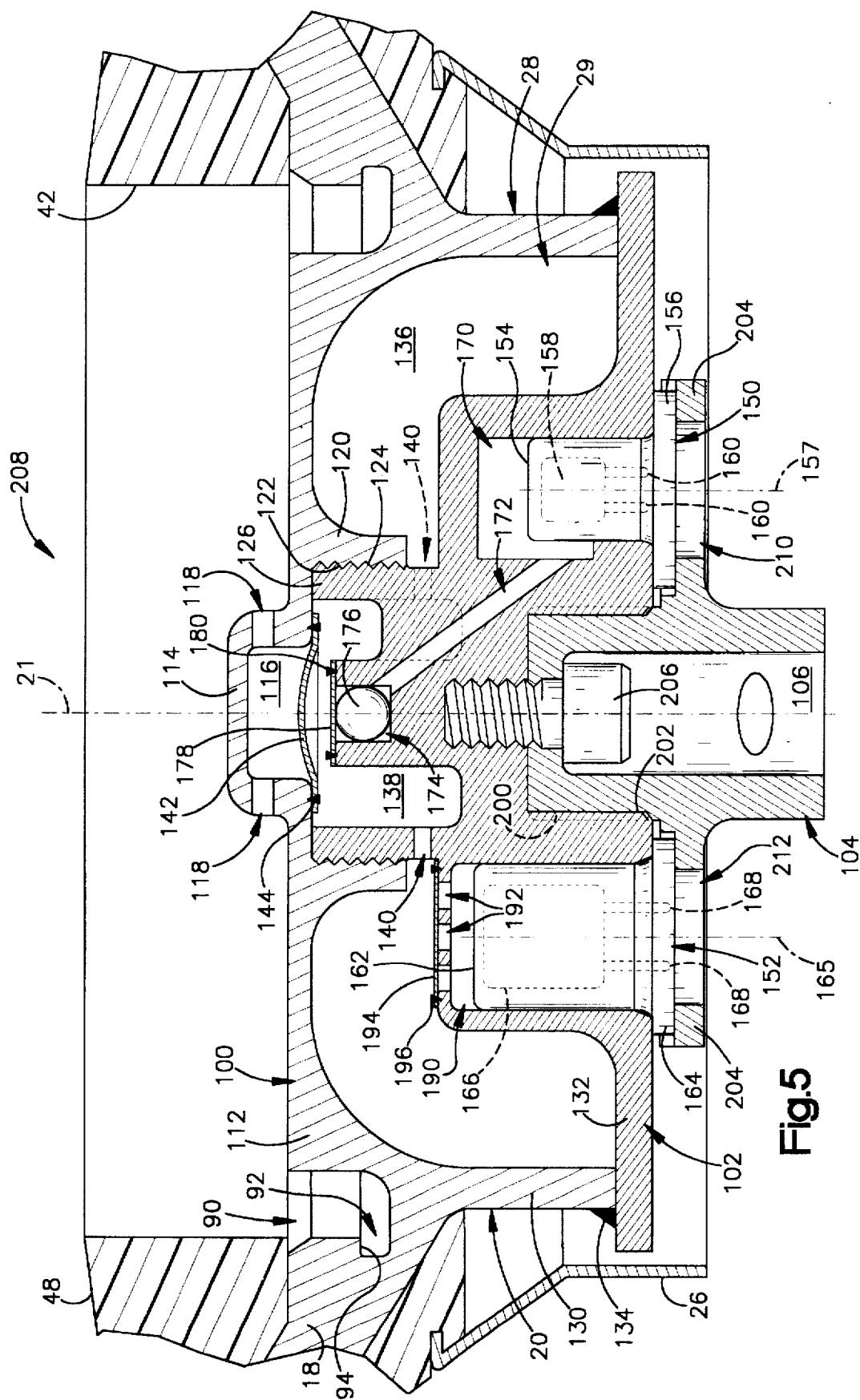
FIG. 5 is an enlarged partial view of other parts shown in FIG. 1.

As best shown in FIG. 5, a cylindrical inner wall 120 of the upper hub part 100 has an internal screw thread 122 centered on the axis 21. The internal screw thread 122 is engaged with an external screw thread 124 on a central portion 126 of the lower hub part 102. When the upper and lower hub parts 100 and 102 are being screwed together, a cylindrical outer wall 130 of the upper hub part 100 moves axially into abutment with a planar, circular base wall 132 of the lower hub part 102. A circumferentially extending weld 134 is then formed at the juncture of the outer wall 130 and the base wall 132 to fix and seal the upper and lower hub parts 100 and 102 together at that location.

A peripheral section 136 of the storage chamber 29 has a generally toroidal shape extending circumferentially around the axis 21 and the central portion 126 of the lower hub part 102. A smaller, central section 138 of the storage chamber 29 is located within the central portion 126 of the lower hub part 102 and communicates with the peripheral section 136 through a plurality of small passages 140 in the central portion 126 of the lower hub part 102. The tank structure 28 further includes a rupturable closure wall in the form of a burst disk 142. The burst disk 142 is centered on the axis 21, and is fixed and sealed to the central portion 114 of the upper hub part 100 by a circumferentially extending weld 144. The burst disk 142 closes the storage chamber 29 between the central section 138 of the storage chamber 29 and the outlet plenum 116.

The apparatus 10 further includes an initiator 150 and a gas generator 152. The initiator 150 is a squib with a cylindrical casing 154 and a circular flange 156, each of which is centered on an axis 157. A small charge of pyrotechnic material 158 (shown schematically) is contained in the initiator casing 154. The pyrotechnic material 158 may have any suitable composition known in the art, and is ignited in a known manner upon the passage of electric current through the initiator 150 between a pair of electrodes 160.

The gas generator 152 similarly has a cylindrical casing 162 and a circular flange 164 centered on a respective axis 165. A body of ignitable gas generating material 166 (also shown schematically) is contained in the generator casing 162. The gas generating material 166 also may have any suitable composition known in the art, and is ignited in a known manner upon the passage of electric current between a corresponding pair of electrodes 168.

The lower hub part 102 defines an initiator chamber 170. The initiator chamber 170 is spaced radially from the axis 21 of rotation, and is open at the bottom of the lower hub part 102. The initiator casing 154 projects upward into the initiator chamber 170, with the axis 157 parallel to the axis 21. A relatively narrow passage 172 communicates the initiator chamber 170 with a small central compartment 174 at the top of the lower hub part 102. A movable steel ball 176 is located in the central compartment 174, and is normally retained in the central compartment 174 by a metal closure disk 178. A circumferentially extending weld 180 fixes and seals the closure disk 178 to the lower hub part 102 around the periphery of the central compartment 174.

The gas generator 152 is received in a generator chamber 190 in the lower hub part 102, with the axis 165 parallel to, and spaced circumferentially from, the axis 157. The generator chamber 190 is open at the bottom of the lower hub part 102. At the other end of the generator chamber 190, a plurality of fluid flow passages 192 extend through the lower hub part 102 between the generator chamber 190 and the storage chamber 29. The passages 192 are closed by a corresponding metal closure disk 194 which is fixed and sealed to the lower hub part 102 by a circumferentially extending weld 196.

The sleeve 104 has external splines 200 engaged with internal splines 202 on the lower hub part 102. The sleeve 104 further has a circular flange 204 projecting radially outward beneath the lower hub part 102. When the sleeve 104 and the lower hub part 102 are being moved axially together, the flange 204 on the sleeve 104 moves axially against the flanges 156 and 164 on the initiator 150 and the gas generator 152, respectively, to hold those parts in the chambers 170 and 190. A threaded fastener 206 is then used to connect the sleeve 104 securely to the lower hub part 102. In this arrangement, the interconnected parts shown in FIG. 5 define a preassembled steering wheel unit 208. The steering wheel unit 208 receives the air bag unit 34 (FIG. 2) upon assembly of the apparatus 10, as described above.

As further shown in FIGS. 1 and 5, the initiator 150 and the gas generator 152 are aligned with a corresponding pair of openings 210 and 212 in the flange 204 on the sleeve 104. The openings 220 and 212 provide access to the initiator 150 and the gas generator 152, respectively, for connection of the electrodes 160 and 168 in an electrical circuit (not shown). As known in the art, such an electrical circuit includes a power source and a normally open switch. The power source preferably comprises the vehicle battery and/or a capacitor. The switch is part of a sensor which senses a condition indicating the occurrence of a vehicle collision. Such a condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect the vehicle driver. The switch then closes and electric current is directed through the initiator 150 to actuate the initiator 150. The electrical circuit further includes a known apparatus for directing electric current through the gas generator 152 to actuate the gas generator 152 at a predetermined time after, or simultaneously with, actuation of the initiator 150.

When the initiator 150 is actuated, the pyrotechnic material 158 is ignited and produces combustion products including heat, hot particles and hot gases. The combustion products are spewed outward from the casing 154, and move upward from the initiator chamber 170 to the central compartment 174 through the passage 172. The combustion products then develop a thrust which propels the steel ball 176 forcefully upward through the closure disk 178 and further upward through the burst disk 142. The inflation fluid is thus released to begin flowing outward from the storage chamber 29 to the outlet plenum 116, and further outward to the air bag 12 through the outlet openings 118.

When the gas generator 152 is actuated, the gas generating material 166 is ignited and rapidly produces a large volume of inflation gas. The inflation gas is spewed outward from the casing 162, ruptures the adjacent closure disk 194, and flows into the storage chamber 29 to mix with the inflation fluid then remaining in the storage chamber 29. The fluid pressure in the storage chamber 29, and the resulting flow of inflation fluid outward to the air bag 12, is thus affected by the gas generator 152 at a predetermined time.

As the inflation fluid begins to flow into the air bag 12, it moves the body 62 of the air bag 12 forcefully upward against the deployment panel 36 on the central cover structure 30. The force resulting from the inflation fluid pressure acting on the body 62 ruptures the deployment panel 36 at the stress riser 56, and moves the deployment doors 52 pivotally upward about the hinges 54. As the inflation fluid continues to inflate the air bag 12, it moves the body 62 outward from the compartment 66 past the deployment doors 52 and further upward from the steering wheel 14 toward the vehicle driver. The mouth 60 of the air bag 12 is retained on the steering wheel 14 by the retainer 32.

Figure 6:
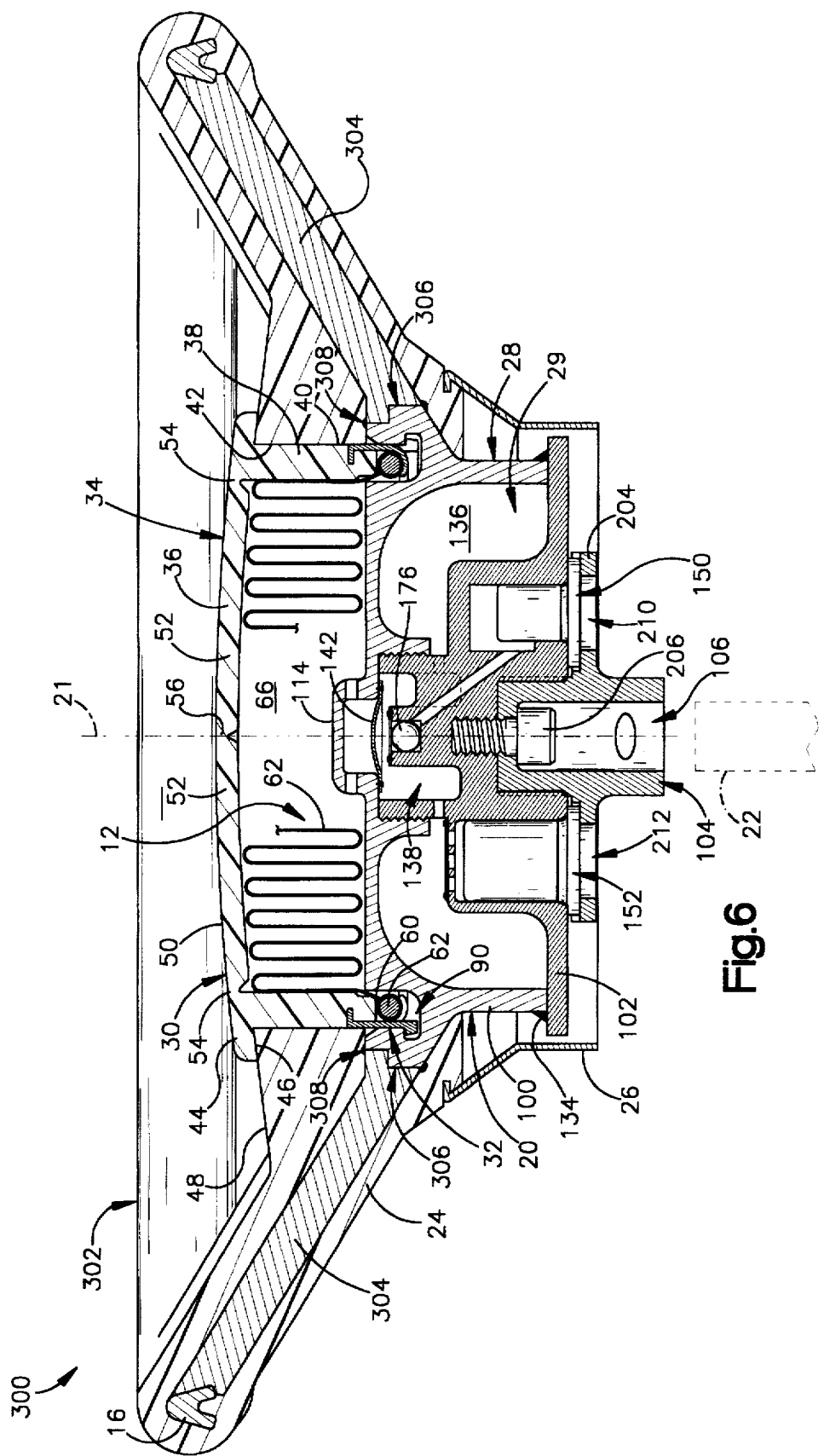
FIG. 6 is a sectional view of a vehicle occupant protection apparatus comprising a second embodiment of the present invention.

An alternative vehicle occupant protection apparatus 300 comprising a second embodiment of the present invention is shown in FIG. 6. The apparatus 300 has many parts that are substantially the same as corresponding parts of the apparatus 110 described above. This is indicated by the use of the same reference numbers in FIGS. 6 and 1 for such parts. Accordingly, the apparatus 300 includes a steering wheel hub 20 which, like the hub 20 described above, comprises a tank structure 28 with a storage chamber 29 containing inflation fluid under pressure. However, the hub 20 in the apparatus 300 is part of an alternative steering wheel 302 with spokes 304 that are constructed as separate parts. Each spoke 304 is fastened directly to the hub 20 at a joint 306 formed by a corresponding weld 308. The apparatus 300 is otherwise the same as the apparatus 10 described above.

The present invention has been described with reference to preferred embodiments. From the foregoing description of the invention, those skilled in the art will perceive improvements, changes and modifications. For example, in the preferred embodiments of the invention, the retainer 32, the base wall 38 of the central cover structure 30, and the groove 90 at the top of the hub 20 have circular peripheral shapes extending circumferentially around the axis 21 of rotation. Those parts can be centered on the axis 21 or offset from the axis 21, and can have alternative peripheral shapes that are wholly or partly rectangular, depending on the shape of the air bag 12. The upper and lower hub parts 100 and 102 in the preferred embodiments also have circular peripheral shapes, but could have different peripheral shapes along with, or independently of, the peripheral shapes of the other parts of the apparatus. Such improvements, changes and modifications within the skill of the art are intended to be covered by the appended claims.

Having described the invention, the following is claimed:

1. Apparatus comprising:

a first unit of interconnected parts, said parts of said first unit including a vehicle steering wheel structure and an electrical initiator, said steering wheel structure comprising a spoke and a hub; and a second unit of interconnected parts, said parts of said second unit including an inflatable vehicle occupant protection device, a cover structure with a deployment door, and a retainer;

said retainer comprising means for interconnecting said protection device and said cover structure separately from said first unit, said retainer further comprising means for snapping into interlocked engagement with said steering wheel structure to connect said second unit to said first unit.

2. Apparatus as defined in claim 1 wherein said retainer is partially embedded in said cover structure and has locking tabs for snapping into interlocked engagement with said hub.

3. Apparatus as defined in claim 2 wherein said protection device has a mouth portion and a folded body portion, said retainer having additional tabs for holding said mouth portion of said protection device together with said cover structure prior to interlocking of said locking tabs with said hub.

4. Apparatus as defined in claim 3 wherein said cover structure comprises a deployment panel and a depending base wall which together define a compartment containing said body portion of said protection device, said mouth portion of said protection device being wrapped around a bead, said additional tabs holding said bead and said mouth portion of said protection device beneath a lower end surface of said base wall prior to interlocking of said locking tabs with said hub.

5. Apparatus as defined in claim 1 wherein said hub comprises a tank structure defining a storage chamber containing inflation fluid under pressure, said tank structure including means for transmitting steering torque from said spoke to a vehicle steering shaft.

6. Apparatus comprising:

a vehicle steering wheel structure including a spoke and a hub;

said hub comprising a tank structure defining a storage chamber containing inflation fluid under pressure, said tank structure including means for transmitting steering torque from said spoke to a vehicle steering shaft;

said tank structure including a hub part defining a first compartment which is separate from said storage chamber, said first compartment containing an electrical initiator with a shape centered on an axis parallel to said axis of rotation.

7. Apparatus as defined in claim 6 wherein said hub further comprises a sleeve centered on said axis of rotation, said sleeve having a radially projecting flange holding said initiator in said first compartment.

8. Apparatus as defined in claim 7 wherein said hub part further defines a second compartment separate from said storage chamber, said second compartment being spaced from said first compartment circumferentially about said axis of rotation and containing an electrically actuatable gas generator, said gas generator having a shape with a central axis parallel to said axis of rotation.

9. Apparatus as defined in claim 8 wherein said flange holds said gas generator in said second compartment.

10. Apparatus comprising:

a vehicle steering wheel structure including a spoke and a hub, said hub comprising a tank structure defining a storage chamber containing inflation fluid under pressure, said tank structure including means for transmitting steering torque from said spoke to a vehicle steering shaft; and a unit of interconnected parts having an installed position mounted on said steering wheel structure, said parts including an inflatable vehicle occupant protection device, a cover structure with a deployment door, and a retainer, said retainer comprising means for interconnecting said protection device and said cover structure separately from said steering wheel structure, said retainer further comprising means for snapping into interlocked engagement with said steering wheel structure upon mounting of said unit in said installed position.

11. Apparatus as defined in claim 10 wherein said protection device has a mouth portion and a folded body portion, said retainer being partially embedded in said cover structure and having a plurality of locking tabs for snapping into interlocked engagement with said hub, said retainer further having a plurality of additional tabs for holding said mouth portion of said protection device together with said cover structure prior to interlocking of said locking tabs with said hub.

* * * * *